United States Patent [19]

DiFlora

[11] 4,236,092
[45] Nov. 25, 1980

[54] COMPRESSOR MOTOR PROTECTION

[75] Inventor: Michael A. DiFlora, Sidney, Ohio

[73] Assignee: Copeland Corporation, Sidney, Ohio

[21] Appl. No.: 913,648

[22] Filed: Jun. 8, 1978

[51] Int. Cl.³ .............................................. H02K 11/00
[52] U.S. Cl. .................................. 310/68 C; 310/112;
62/508
[58] Field of Search ...................... 310/68 R, 68 C, 89,
310/71, 112, 113, 114; 361/25, 26, 27; 318/783;
62/508

[56] References Cited

U.S. PATENT DOCUMENTS

| | | | |
|---|---|---|---|
| 2,463,935 | 3/1949 | Fish | 310/68 C |
| 2,979,917 | 4/1961 | Meagher | 62/508 |
| 3,183,383 | 5/1965 | Slonneger | 310/68 R |
| 3,395,297 | 7/1968 | Shifly | 310/71 |
| 3,875,439 | 9/1973 | Roach | 310/68 C |
| 4,138,862 | 2/1979 | Muller | 62/508 |

Primary Examiner—R. Skudy
Attorney, Agent, or Firm—Harness, Dickey & Pierce

[57] ABSTRACT

There is disclosed herein an improved motor protection assembly for a motor compressor comprising a motor cover having an opening provided on a side wall thereof adjacent the exposed end turns of the motor stator windings. A motor protection device is adjustably secured to the motor cover and projects through the opening into engagement with a portion of the stator windings so as to enable sensing of abnormal conditions existing within these windings. The motor protection device is electrically connected to the stator windings so as to de-energize the windings in response to such abnormal sensed condition. The adjustable securing arrangement allows the axial positioning of the motor protection device within the opening to be varied thereby enabling a standard motor cover to be used with stator windings of different sizes and different manufacturers.

11 Claims, 6 Drawing Figures

COMPRESSOR MOTOR PROTECTION

BACKGROUND AND SUMMARY OF THE INVENTION

The present invention relates generally to motor compressors and more particularly to arrangements whereby motor protection devices may be conveniently installed thereon.

Various arrangements have been used in order to secure thermally responsive motor protection devices to stator windings of motor compressors such as refrigeration compressors. In one of these various arrangements, a thermal sensor is secured directly to the stator windings by suitable ties generally fabricated from a plastic composition. This assembly is not totally satisfactory in that the ties often loosen during operation of the motor compressor unit due to the heat generated by the motor as well as the vibration encountered. This loosening may reduce the efficiency of heat transfer to the sensor, as well as enabling the sensor to vibrate against the windings causing deterioration of and possibly eventual failure of the insulation.

In another arrangement, the thermal sensors are embedded within the windings during fabrication of the stator assembly with electrical leads being brought out of the assembly along with the stator coil leads. While this arrangement overcomes the loosening problem associated with the externally secured protection device, it requires additional control circuitry to be installed and connected as these sensors are relatively small and of low current carrying capability. The addition of other control components not only increases costs of assembly in that they require additional connections to be made but also represent additional potential sources for system failure.

Accordingly, the present invention overcomes these disadvantages in providing a motor protection assembly in which the motor protection device is secured to and retained in heat transfer relationship with the stator windings by a motor cover substantially enclosing the end turns of the stator. The protection device is secured to the motor cover in such a manner as to allow the distance which the protection device protrudes into the interior of the cover to be varied thereby enabling a standard sized cover and protector assembly to be used on different size stator assemblies. Further, as the protection device can project outward beyond the motor cover, a greater space is available so as to enable the use of line break protection devices which can be directly connected to the motor winding circuit without the need for separate control circuitry. This feature offers the advantages of improved reliability due to the need for fewer components as well as reduced cost both in materials and labor. Additionally, the protection device electrical connections are entirely within the outer shell thus eliminating the need to provide additional fusite connectors as well as enabling a smaller external terminal box to be employed and eliminating the possibility of unauthorized tampering with the protector connections. Further, the present invention is well suited for assembly line assembly as the positioning of the protector with respect to the stator is controlled so as to substantially eliminate the possibility that the protector may be secured in an incorrect position on the windings as well as eliminating the possibility of winding ties being over or under stressed.

Additional advantages and features of the present invention will become apparent from the subsequent description and the appended claims taken in conjunction with the accompany drawings, which set forth by way of illustration and example the preferred embodiments of the present invention.

DESCRIPTION OF THE PREFERRED EMBODIMENTS

Figure 1:
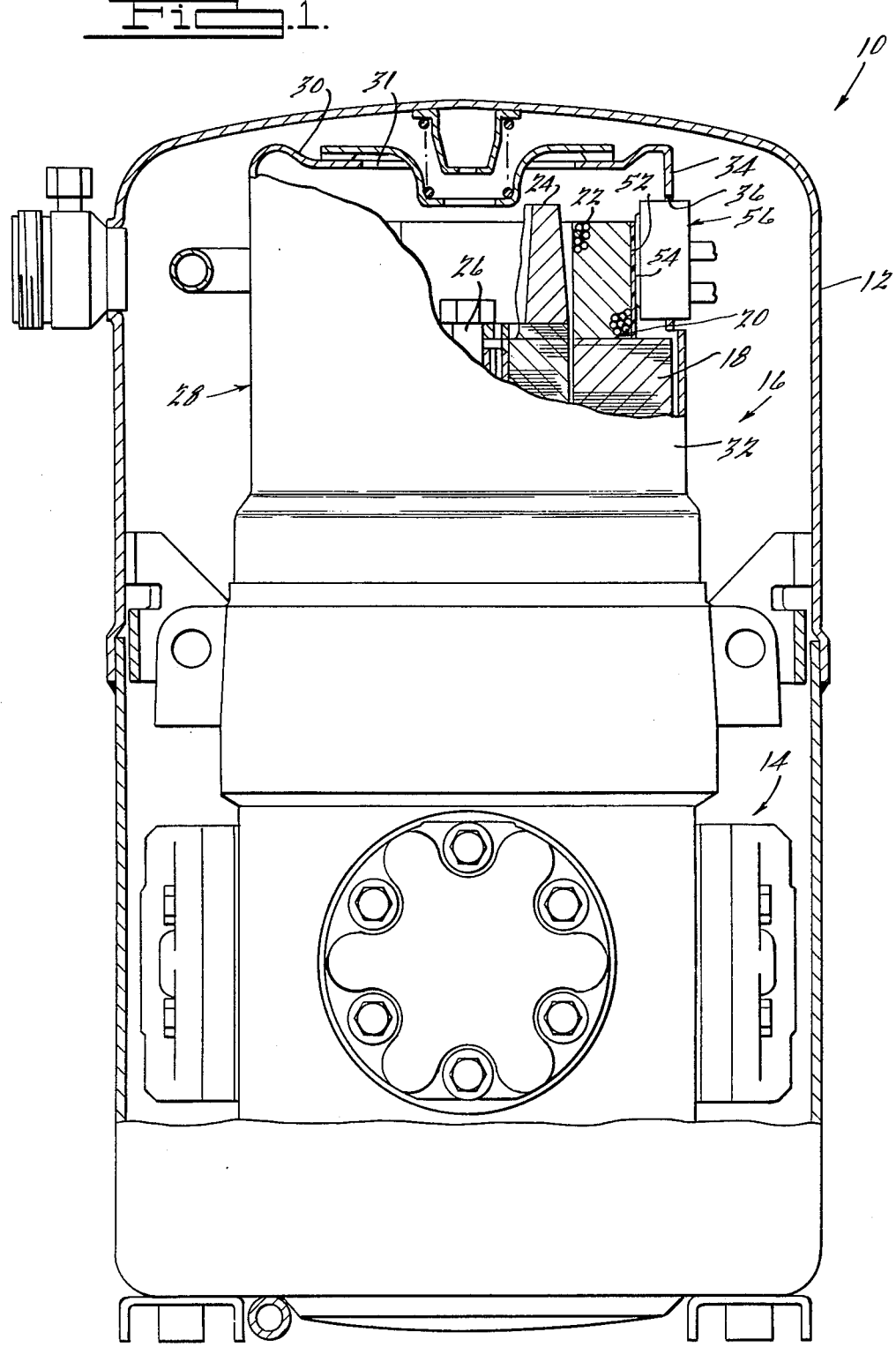
FIG. 1 is an elevational view of a hermetic refrigeration compressor in accordance with the present invention with the outer shell shown in section and portions of the compressor being broken away.
Figure 2:
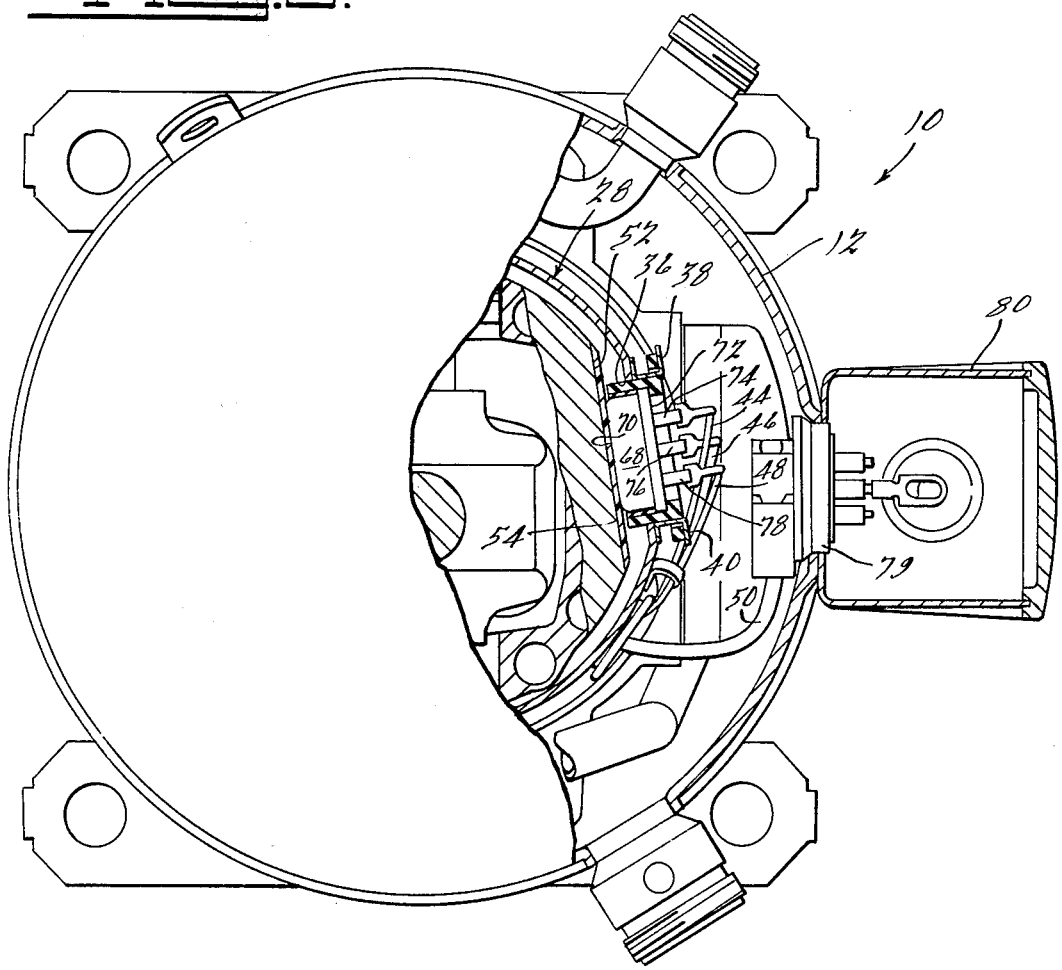
FIG. 2 is a plan view of the refrigeration compressor of FIG. 1 also having portions thereof broken away.
Figure 3:
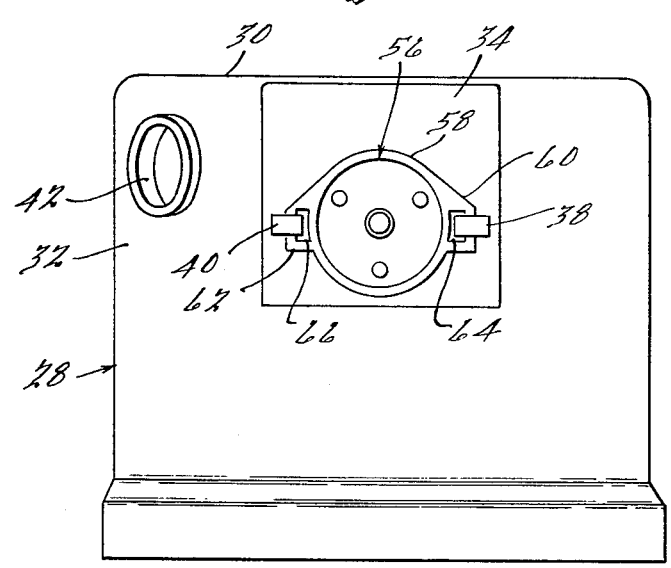
FIG. 3 is an elevational view of the motor cover of FIGS. 1 and 2 having a motor protection device assembled thereto.

Referring now to the drawings and in particular to FIGS. 1 through 3, there is shown a hermetic refrigeration compressor indicated generally at 10 and comprising an outer shell 12 within which is housed a compressor 14 of the reciprocating piston type and an electric motor 16 drivingly connected thereto.

It should be noted that while the present invention is described with reference to a reciprocating piston type compressor, it may be employed in connection with any type of motor compressor unit such as for example rotary or screw types.

Motor 16 includes a stator core 18 and stator windings 20 having end turns 22 projecting upwardly and outwardly from stator core 18. A rotor 24 is secured to a crankshaft 26 and cooperates with stator core 18 and windings 20 to drive compressor 14.

A motor cover 28 of a generally cylindrical shape having a top 30 and side wall 32 is also provided which overlies and substantially encloses motor 16, the same being suitably secured to an upper portion of compressor 14. Motor cover 28 is provided with a suction gas inlet opening 31 in the top portion 30 thereof through which suction gas is drawn by compressor 14.

Side wall 32 of motor cover 28 is provided with a relatively flat portion 34 having a large diameter opening 36 provided therein. A pair of outwardly projecting tab portions 38 and 40 are also provided secured to motor cover 28 immediately adjacent to and on substantially diametrically opposed sides of opening 36. Tab portions 38 and 40 may be secured to motor cover 28 in any suitable manner such as by welding, brazing, soldering, or even by a suitable adhesive. Alternatively, tab portions 38 and 40 may be integrally fabricated with motor cover 28. A second smaller opening 42 is also provided in side wall 32 spaced from opening 36 which is designed to accommodate stator winding leads 44, 46, 48, and 50 extending therethrough.

It should be noted that while the preferred embodiment of the present invention provides a flat portion 34 on the motor cover 28, opening 36 could also be disposed in any other suitable portion thereof such as for example a curved side wall portion or even a top portion thereof. Similarly, while only two tab portions 38 and 40 are illustrated being disposed in opposed relationship, additional tab portions may be also provided and/or the positioning thereof may be altered to any suitable desired configuration. Also, any other suitable fastening means may be substituted for tabs 38 and 40 such as for example screws, studs, wires or the like. Further, if desired, opening 36 may be in the form of an elongated slot or oval opening in place of providing a second opening 42 or openings 36 and 42 may be positioned in overlapping relationship.

End turns 22 of stator windings 20 are provided with a substantially flat laterally extending portion 52 which is disposed in substantially aligned relationship to flat portion 34 and has a layer of insulating material 54 secured to the outer surface thereof. Insulating material 54 may be of any suitable type having good abrasion resistance such as for example Mylar and will generally be secured to end turns 22 by conventional winding ties or in any other suitable manner.

A motor protection module 56 is also provided extending through opening 36 and comprises a housing portion 58 of generally cylindrical shape having a pair of radially outwardly extending ears or tab portions 60 and 62 adjacent the outer end thereof each of which is provided with a generally rectangular shaped opening 64 and 66 respectively. Motor protection module 56 is preferably of the thermal responsive line break type such as a type 32 HM available from Texas Instruments the operative components of which are contained within a generally cylindrically shaped sealed can 68 disposed within housing 58. These protectors are designed to be actuated in response to either sensed over temperature of the windings or excessive current draw or a combination thereof. End portion 70 of can 68 is substantially flat and adapted to be secured in engaging relationship with insulating material 54 and heat transfer relationship with flat portion 52 of end windings 22. End portion 72 is provided with terminals 74, 76, and 78 to which stator winding leads 44, 46, and 48 respectively are connected. Stator winding leads 50 extend to and are electrically connected to the interior terminals of a fusite 79 having contacts extending through a portion of outer shell 12 into a terminal box 80 in which suitable electrical feed lines may be connected so as to supply power to motor 16.

Motor protection module 56 may be easily assembled to motor cover 28 subsequent to the assembly of motor cover 28 to motor 16 by merely inserting module 56 into opening 36 with openings 64 and 66 of ears 60 and 62 positioned so as to receive tab portions 38 and 40 respectively. Module 56 is inserted through opening 36 so as to bring end portion 70 into contact with insulating material 54 and thereby into heat transfer relationship with flat portion 52 of end turns 22. Thereafter, tab portions 38 and 40 may be deformed over ears 60 and 62 so as to secure module 56 in position. Once module 56 is secured in position stator leads 44, 46, and 48 may be easily connected thereto.

It should be noted that the diameter of the stator end turns may vary from one stator to the next as well as between stators of different ratings. Accordingly, if the same motor cover is used, the distance between flat portion 52 of stator end turns 22 and opening 36 will also vary. However, the present invention is designed to easily compensate for these variables as ears 60 and 62 are positioned at the extreme outer edge of housing 58 thereby allowing the positioning of module 56 to be varied by a distance almost equal to the axial length of housing 58.

It should also be noted, however, that while the preferred embodiment utilizes a substantially flat portion 52, the present invention may also be utilized to secure a motor protector in engagement with a conventionally formed portion of the end turns. Alternatively, if desired, the protector may be mounted in suitable openings provided in the top 30 of motor cover 28 in which case the protector will engage the top of the stator end turns.

Figure 4:
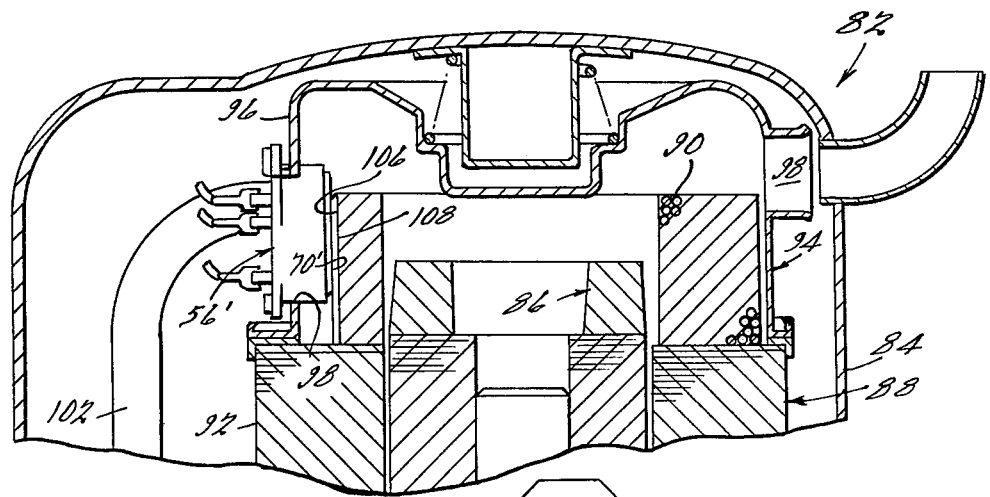
FIG. 4 is a fragmentary sectioned view of another embodiment of the present invention, the section being taken along a vertical plane passing through the rotational axis of the motor compressor.
Figure 5:
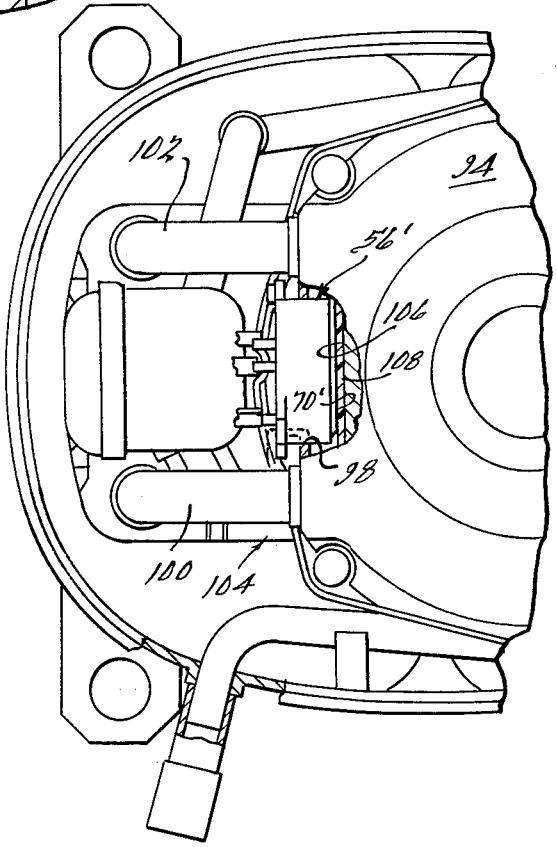
FIG. 5 is a view similar to that of FIG. 2 but illustrating the embodiment of FIG. 4.
Figure 6:
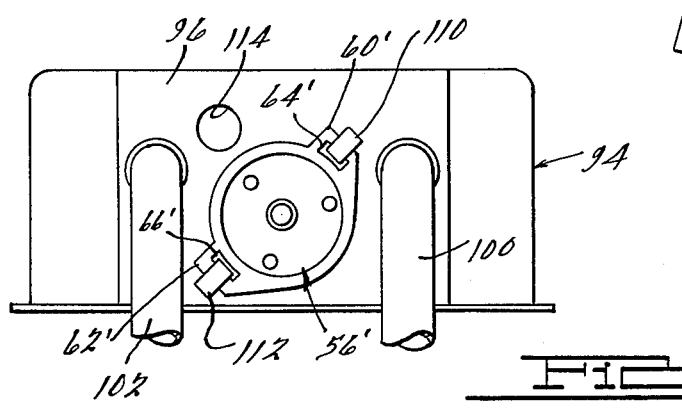
FIG. 6 is a view similar to that of FIG. 3 but illustrating the embodiment of FIG. 4.

Referring now to FIGS. 4 through 6, there is illustrated another embodiment of the present invention including a portion of a motor compressor 82. Motor compressor 82 is similar to motor compressor 10 having an outer shell 84, rotor 86 drivingly connected to compressor means 104, a stator surrounding rotor 86 and having end turns 90 projecting outwardly from one end of a stator core 92, and a motor cover 94 substantially enclosing end turns 90.

Motor cover 94 also has a substantially flat portion 96 in which an opening 98 is provided having a motor protection device 56' installed therein. Motor protection device 56' is substantially identical to device 56 and thus further description thereof is believed unnecessary. Motor cover 94 is similar to motor cover 28 except that rather than allowing suction gas to enter the motor compartment through an opening in the top thereof, a suction gas inlet 98 is provided in the side wall thereof. Also a pair of substantially parallel spaced conduit members 100 and 102 are provided extending from motor cover 94 to compressor means 104 so as to supply suction gas thereto.

Also, similar to that described with reference to FIGS. 1 through 3, end turns 90 are provided with a substantially flat portion 106 having a layer of insulating material 108 secured thereto against which end portion 70' of device 56' bears. Device 56' is secured in position by tab portions 110 and 112 which are integrally formed with motor cover 94 and extend through openings 64' and 66' provided in outwardly extending ears 60' and 62' respectively of device 56'.

In this embodiment, a relatively small diameter opening 114 is also provided on flat surface portion 96 of motor cover 94 spaced from opening 98 through which electrical leads may be brought out and connected in the same manner as described with reference to FIGS. 1 through 3.

It should also be noted that as ears 60' and 62' are formed on device 56' immediately adjacent the outer edge thereof, device 56' may be easily adjusted with respect to opening 98 to accommodate dimensional variations between different stator windings. Also, flat portions 106 and 52 will preferably be positioned at the portion of the upper winding end turns that best accommodates the protector application. For example, flat portions 106 and 52 may be positioned at the hottest surface area of the upper end turns or at any other convenient location as the protector may be selected with a suitable desired trip point to correspond thereto. Preferably, the location will be selected so as to enable a single protector to be used in conjunction with stator windings of different designs supplied by different manufacturers while providing consistent operation characteristics therebetween. As the location of this "hot spot" is substantially design dependent it will be located in substantially the same relative position for each stator of a given manufacturer. Therefore, it is possible to specify the location of the flat portion of the winding as well as location of mounting openings to insure consistent proper positioning of the thermal sensor with respect thereto.

It is, therefore, apparent that the present invention offers numerous advantages over the methods heretofore employed. As the motor protection module is securely retained by deforming the tab portions provided on the motor cover, the likelihood of the module becoming loose is greatly decreased. Further, the present invention enables the larger line break type protector to be used thus not only providing more reliable protection but also reducing the number of components required and reducing both cost of material and assembly time. Furthermore, the presence of the additional insulating material between the module and the windings insures that vibrational forces will not cause the module to wear away the winding insulation thus precluding the possibility of sensor induced motor failure.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A hermetic motor compressor comprising:
   an outer shell;
   compressor means disposed within said shell;
   motor means disposed within said shell and drivingly connected to said compressor means, said motor means including a stator having windings projecting outwardly from one end thereof;
   a motor cover of a predetermined size substantially enclosing said windings and having an opening provided therein;
   motor protection means of a predetermined size extending through said opening into engaging relationship with said windings; and
   fastening means including a projection provided on and extending outwardly from said motor cover for securing said motor protection means within said opening, a portion of said motor protection means cooperating with said projection to secure said motor protection means in engaging relationship with said windings for different size stators whereby said predetermined size motor cover and said predetermined sized motor protector may be utilized with stators of different sizes.

2. A motor compressor as set forth in claim 1 wherein said fastening means comprises outwardly projecting ears provided on said motor protection means, said ears cooperating with said projection to secure said motor protection device to said motor cover.

3. A motor compressor as set forth in claim 2 wherein said ears are provided with openings and said projection comprises a pair of spaced deformable tabs secured to said motor cover.

4. A motor compressor as set forth in claim 3 wherein said deformable tabs are integral with said motor cover.

5. A motor compressor as set forth in claim 1 wherein said windings include a substantially flat portion, said motor protection means being positioned so as to engage said substantially flat portion in heat transfer relationship.

6. A motor compressor as set forth in claim 5 further comprising insulating means disposed between said motor protection means and said windings.

7. A motor compressor as set forth in claim 6 wherein said insulating means comprises a sheet of Mylar.

8. A motor compressor as set forth in claim 1 wherein said motor protection means comprises a thermal line break device and said motor windings are electrically connected thereto.

9. A motor compressor as set forth in claim 1 wherein said opening is positioned on a side wall of said cover adjacent said windings.

10. A motor compressor as set forth in claim 9 wherein said motor cover is provided with a substantially flat side wall portion and said opening is positioned on said substantially flat portion.

11. A motor compressor as set forth in claim 10 wherein said substantially flat portion of said motor cover is positioned in substantially parallel spaced relationship with said flat portion of said windings.

* * * * *

UNITED STATES PATENT AND TRADEMARK OFFICE
CERTIFICATE OF CORRECTION

PATENT NO. : 4,236,092

DATED : November 25, 1980

INVENTOR(S) : Michael A. DiFlora

It is certified that error appears in the above-identified patent and that said Letters Patent are hereby corrected as shown below:

Column 4, line 19: after "stator" insert —88—

Signed and Sealed this

Third Day of March 1981

[SEAL]

Attest:

RENE D. TEGTMEYER

*Attesting Officer*    *Acting Commissioner of Patents and Trademarks*